Dec. 29, 1931.  A. W. FREHSE  1,838,381
BRAKE CENTRALIZER
Filed Sept. 28, 1929   2 Sheets-Sheet 1
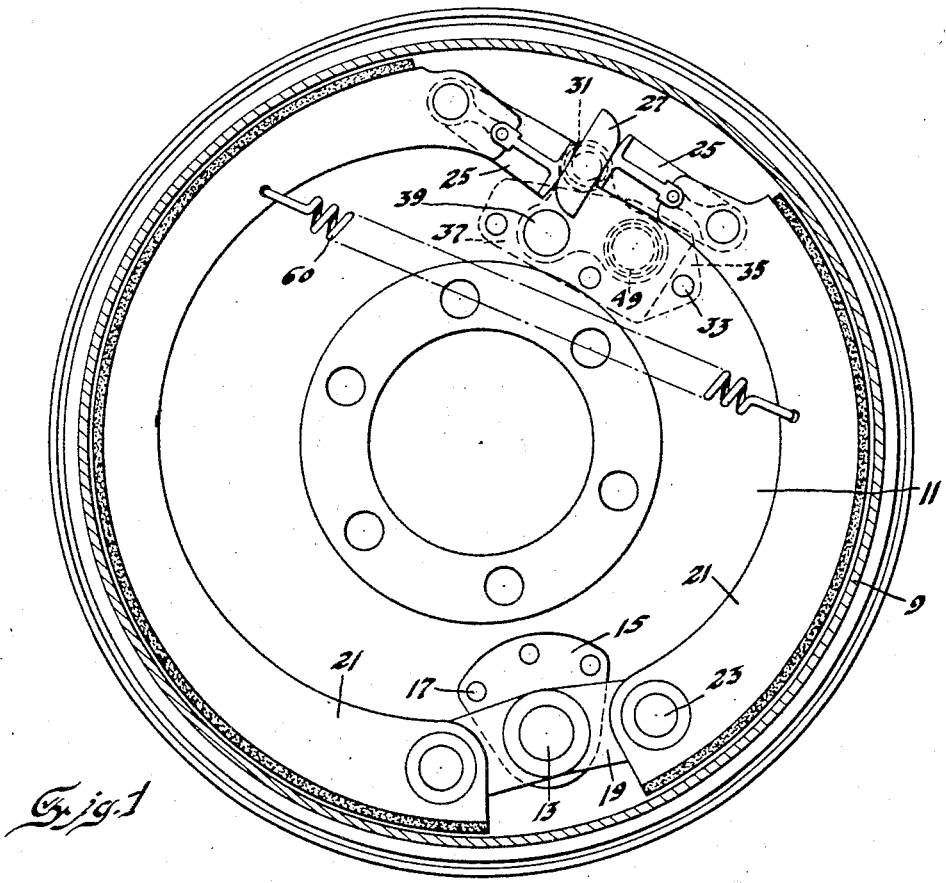
Fig. 1
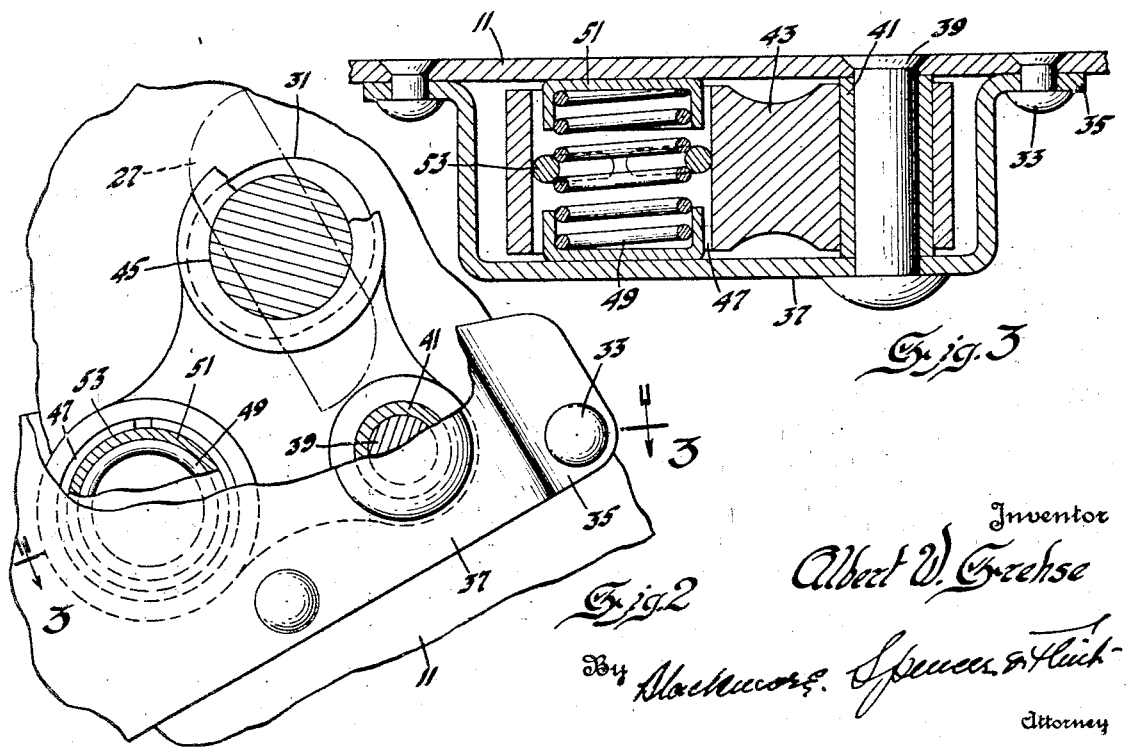
Fig. 2
Fig. 3
Inventor
Albert W. Frehse
By Blackmore, Spencer & Flick
Attorney Dec. 29, 1931.  A. W. FREHSE  1,838,381
BRAKE CENTRALIZER
Filed Sept. 28, 1929    2 Sheets-Sheet 2
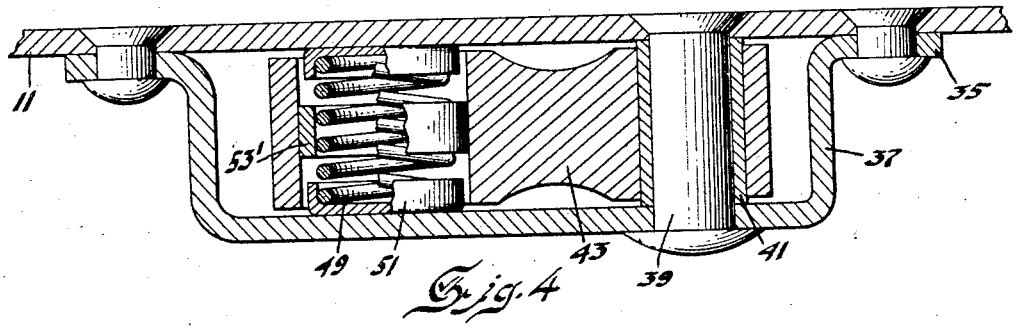
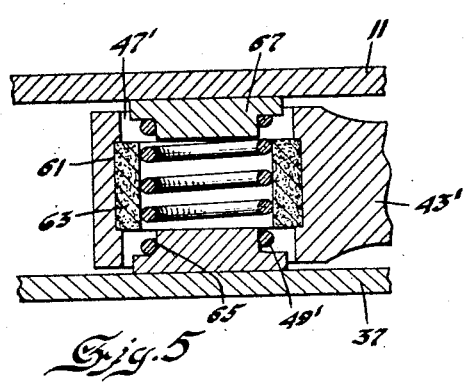
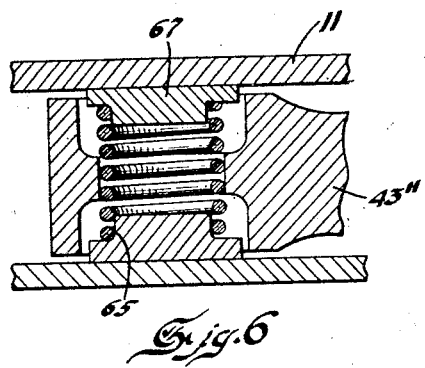
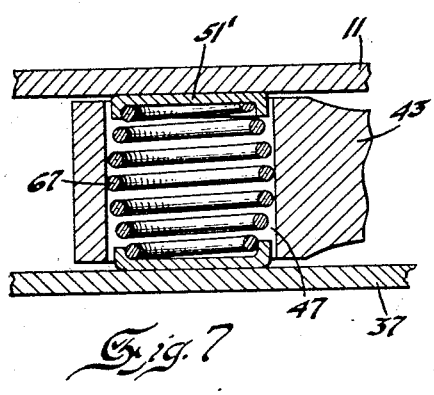
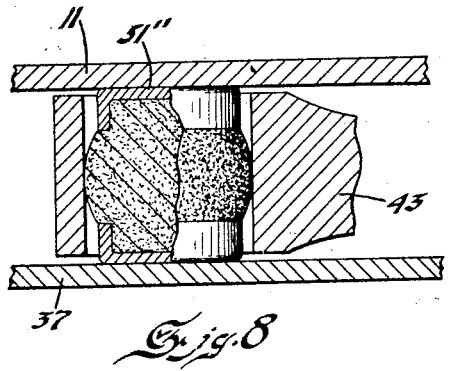
Inventor
Albert W. Frehse
By Mackmose, Spencer & Huth
Attorneys Patented Dec. 29, 1931

1,838,381

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

BRAKE CENTRALIZER

Application filed September 28, 1929. Serial No. 395,898.

This invention relates to brakes and particularly to brakes for vehicles.

An object of the invention is to provide a simple arrangement for accommodating self-actuation and to associate therewith self-adjusting device. Other objects and advantages will be understood from the following description and the accompanying drawings.

In the drawings Figure 1 is a section through the brake drum flange showing the internal arrangement of the shoes. Figure 2 is a detail view in elevation, parts broken away and in section. Figure 3 is a section on line 3—3 of Figure 2. Figure 4 is a section similar to that of Figure 3 but illustrating a modified form. Figures 5, 6, 7 and 8 are sections similar to Figure 3 each showing a further modification.

Referring by reference characters to the drawings and first to Figures 1, 2 and 3, numeral 9 is used to represent the flange of a brake drum which drum may be carried by the vehicle wheel as usual. 11 is the backing plate, this plate being as usual carried fixedly by the rear axle housing or in the case of the front wheel being non-rotatably mounted on the steering knuckle. The backing plate 11 serves as usual as the anchorage for the brake shoes and to support the shaft carrying the cam or its equivalent by which the shoes are expanded into frictional engagement with the rotating drum.

At 13 is a pivot pin carried by the backing plate 11 and by plate 15 secured thereto by suitable fastening means 17. On the pivot pin 13 swing links 19 pivoted to adjacent ends of shoes 21 as at 23. These links provide for an articulated shoe anchorage whereby the shoes conform to the drum contour. The other ends of the shoes are provided with cam followers 25 for engagement with a rotating cam 27 which is used to expand the shoes into frictional engagement with the drum. The cam shaft is not journalled directly in the backing plate but passes through an enlarged opening 31 in the backing plate. A plurality of fastening means 33 extends through the backing plate and a flange 35 is formed on a plate 37 the major part of which is spaced from the backing plate as seen best in Figure 3. A pin 39 surrounded by a sleeve 41 constitutes a pivotal support for a roughly triangular block 43, the pin and sleeve being supported by backing plate and plate 37 as shown. At 45 is an opening in the block for the rotatable support of the cam shaft which as explained above extends through the enlarged opening 31 of the backing plate. The cam shaft is as usual rotatable upon its longitudinal axis which rotation may be effected by any desired brake linkage. It will be understood that the enlarged opening 31 makes it possible for the block 43 carrying the cam shaft to rotate about its pivot 39. It is this rotary movement which is made use of to permit the cam to follow the leading shoe which is self-actuated by the rotating drum whereby the applied effort for expanding the shoes is equally divided between the two shoes in a manner well understood.

At 47 is another opening in the block 43. Within this opening is a spring 49 having a diameter somewhat less than that of the opening 47 in the block. Spring 49 is seated in cups 51, one of these cups engaging the backing plate and the other engaging the plate 37. The cups 51 are also of less diameter than that of opening 47, so that a clearance exists between the internal wall of opening 47 and the peripheral wall of the cups. Surrounding the spring 49 midway between its ends is a split steel ring 53 in contact with the spring and also in contact with the inner surface of opening 47. A suitable releasing spring 60 serves to hold the shoes against the cam.

As block 43 swings to accommodate the unequal influence of self-actuation upon the two shoes, the ring 53 distorts spring 49 by a pressure transversely of its axis, but without necessarily moving the spring and the cups bodily. The stored up energy in spring 49 as a result of this transverse distortion is then available to return the swinging block 43 with the cam and its shaft to the initial centralized position after the brake is released. In this way the centralization of the cam relative to the back plate is accomplished and there is no danger of the leading shoe remaining in drum contact as it might under the influence of self-actuation, especially in the case of the brake being released without completely stopping the motion of the vehicle. In constructions of this general type it has been recognized that provision should be made to adjust the centralized position of the equivalent of block 43. Otherwise, if one shoe lining wears excessively the automatic action described above may be of such an extent as to exceed the relative movements permitted. To that end it has been proposed to pivot the equivalent of the block 43 to a plate which is itself mounted for manual adjustment relative to the backing plate. The present construction renders such manual adjustment unnecessary and the adjustment is made automatically. If the shoe clearance is unequal and this inequality is sufficient to cause the cups 51 to be engaged by the inner wall of opening 47 of block 43 the cups will be bodily moved together with the spring 49 in its deformed position these cups 51 sliding frictionally along the faces of the back plate and the plate 37 to a new position of adjustment. Thereupon when the brake is released the deformation of the spring 49 ceases as before but since cups 51 have been moved to a new position of adjustment, a new adjusted centralized position has been automatically secured wherein the clearance of the two shoes is substantially the same.

In the operation of the device the shoes are subject to self-actuation resulting from contact with the rotating drum. The pressure between the leading shoe and the cam is reduced and the rotation of the other shoe under the influence of the rotating drum resists cam rotation. A known remedy for this difficulty whereby the applied pressure is equally divided between the two shoes is to mount the cam for bodily movement. It is also well recognized that after the cam is bodily moved or floated from its initial position it should be automatically restored or centralized. In the present case the floating is accomplished by the swinging of the block 43 about its pivot 39. During this floating movement the cups 51 are held against the backing plate and plate 37 frictionally by the pressure of the spring 49. However, during such floating movement the ring 53 exerts a pressure transversely with reference to the longitudinal axis of the spring and deforms the spring in a manner which will be obvious. This deformation creates sufficient potential energy in the spring to afford a simple and effective means to permit the cam to float under the influence of self-actuation and to restore the cam to its centralized position and with this simple construction there is provision for automatic adjustment of the position of centralization whereby at all times the clearance between each shoe and the drum is the same.

In Figure 4 the parts are substantially the same as those described above with the exception that in the place of the ring 53 circular in cross section there is a ring 53' which is rectangular in cross section. This ring 53' performs the same function as the ring 53 in deforming the spring 49 in a direction at right angles to its longitudinal axis. Being of greater axial extent, it is designed to more effectively deform the spring and serves therefore as a somewhat more efficient means in restoring the parts to centralized position. In Figure 5 the block 43' is somewhat modified. It has an annular recess 61 in which is seated a ring 63 which may be of rubber. The ring fits snugly in the recess and engages the spring 49'. In this case the spring 49' is shown as seated around a circular extension 65 of a frictional block 67 the outer dimension of which is less than the interior dimension of the opening 47' of the block 43'. The action here again is substantially the same, the deformation of the spring 49' being supplemented by the deformation of the rubber ring 63. Figure 6 employs the block 67 as shown in Figure 5. In this figure the substantial equivalent of ring 53' of Figure 4 is made as an integral part of the modified block 43''. The operation of this modification will be fully understood without explanation.

In Figure 7 is shown a block which is substantially the same as that of Figure 3 and which is designated by the same reference character 43. In this case the ring 53 is omitted and the spring 67 is of barrel shape, its reduced diameter ends seated in cups 51' as in that form of the invention shown by Figure 3. It will be at once understood that the intermediate portion of the spring engages the inner face of the opening 47 with the result that no such member as 53 is needed. As the member 43 swings it initially deforms the spring 67 and should the swinging movement be sufficient to engage the cups 51', these cups together with the spring in its deformed condition may be moved to secure a new position of adjustment wherein the clearance between each shoe and the drum is the same.

In Figure 8 I have shown still another modification. Block 43 is substantially the same. The cups 51'' receive the reduced ends of a rubber block and the intermediate portion of the rubber block bulges outwardly into engagement with the inner periphery of the opening of block 43. The operation of this form is substantially the same as before. Deformation of the rubber blocks occurs to create sufficient energy to swing the member 43 back to its initial position. The occasional movements of the cups 51'' carrying the distorted rubber block serves to effect the necessary adjustment of the centralized position.

I claim:

1. In a brake, a drum, a relatively fixed anchor plate, shoes to engage the drum, a member movably mounted relative to the backing plate, to effect the frictional engagement of the shoes with the drum, means to restore said movable member to centralized position relative to the fixed plate to adjust the normal position of centralization to thereby attain equal shoe clearance, said means operating automatically in connection with the operation of applying the brake through the instrumentality of said movably mounted member, said means including a resilient member and a part acting to deform said resilient member in a direction at right angles to its axis whereby the resilient member is energized to effect centralization.

2. In a brake, a drum, a relatively fixed anchor plate, shoes to engage the drum, a member movably mounted relative to the backing plate, to effect the frictional engagement of the shoes with the drum, means to restore said movable member to centralized position relative to the fixed plate to adjust the normal position of centralization to thereby attain equal shoe clearance, said means operating automatically in connection with the operation of applying the brake through the instrumentality of said movably mounted member, said means including a resilient member, and a part acting to deform said resilient member in a direction at right angles to its axis, said part being itself deformable.

3. In a brake, frictional engaging elements, one element including a plurality of shoes, a member mounted to move said shoes and to itself move bodily therewith to accommodate self-actuation, resiliently controlled frictional means positioned to be moved by said member to substantially equalize the clearance between each of said shoes and the other friction element when said frictional engaging parts are in released position.

4. The invention defined by claim 3, said resiliently controlled friction means including a resilient member, means engaging and deforming said member in a direction transverse to its longitudinal axis under the influence of self-actuation whereby the applied pressure is divided equally between said shoes and whereby the brake applying member is restored to its centralized position.

5. In a brake, a drum, shoes to engage the drum, a backing plate, shoes anchored to said backing plate, a block pivoted to said backing plate, a cam shaft journalled in said block, said cam shaft having a cam for expanding said shoes into drum contact, said block having an opening therethrough, means including a resilient member within and spaced from the periphery of said opening and frictionally engaging said backing plate and means engaging the inner periphery of said block opening and said resilient means intermediate the ends of said resilient means.

6. The invention defined by claim 5, said last named means being itself deformable.

7. In a brake comprising a drum, expansible shoes to engage the drum and rotatable means to expand said shoes into frictional engagement with said drum, mechanism to provide bodily movement for said means to accommodate self-actuation, deformable means to restore said mechanism and means to centralized position, said deformable means being automatically bodily moved after a predetermined movement of said mechanism whereby said rotatable means may be adjusted to positions wherein the clearance of said shoes is equalized when the brake is released.

8. The invention set forth in claim 7, said rotatable means being journalled in said mechanism, said mechanism, having an opening therethrough, said deformable means being positioned within and spaced from the peripheral wall of said opening.

9. The invention set forth in claim 7, said rotatable means being journaled in said mechanism, said mechanism having an opening therethrough said deformable means being positioned within and spaced from the wall of said opening, an element carried by said mechanism within said opening to engage an intermediate part of said deformable means to effect its deformation whereby the centralized position of the movable means is restored after actuation of said brake by rotation of said rotatable means.

10. In a brake, brake members, means to actuate said members, mechanism to mount said actuating means including parts operating automatically to restore the said means to centralized position and also to automatically predetermine said centralized position in accordance with the condition of said brake members.

11. In a brake, a drum, a relatively fixed anchor plate, shoes to engage the drum, a member movably mounted relative to the backing plate to effect the frictional engagement of the shoes with the drum, means to restore said movable member to centralized position relative to said shoes and also to automatically adjust the normal position of centralization to thereby attain equal shoe clearance, said means operating automatically in the performance of both said functions in connection with the operation of applying the brakes.

In testimony whereof I affix my signature.

ALBERT W. FREHSE.